United States Patent
Smets et al.

(10) Patent No.: US 11,176,547 B2
(45) Date of Patent: Nov. 16, 2021

(54) TRANSACTION CRYPTOGRAM

(71) Applicant: MasterCard International Incorporated, Purchase, NY (US)

(72) Inventors: Patrik Smets, Nijlen (BE); Michael Ward, Somerset (GB); David Anthony Roberts, Cheshire (GB); Jonathan James Main, Hampshire (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 756 days.

(21) Appl. No.: 15/892,780

(22) Filed: Feb. 9, 2018

(65) Prior Publication Data

US 2018/0240110 A1 Aug. 23, 2018

(30) Foreign Application Priority Data

Feb. 21, 2017 (EP) .................................... 17157269

(51) Int. Cl.
*G06Q 20/38* (2012.01)
*H04L 9/08* (2006.01)
(Continued)

(52) U.S. Cl.
CPC ..... *G06Q 20/3829* (2013.01); *G06Q 20/3223* (2013.01); *G06Q 20/3278* (2013.01);
(Continued)

(58) Field of Classification Search
CPC ............................................. G06Q 20/00–425
See application file for complete search history.

(56) References Cited

U.S. PATENT DOCUMENTS

| 2002/0083327 | A1* | 6/2002 | Rajasekaran | ......... H04L 9/0863 |
| | | | | 713/182 |
| 2006/0265340 | A1 | 11/2006 | Ziv et al. | |
| 2012/0023024 | A1* | 1/2012 | Evans | .................. G06Q 20/352 |
| | | | | 705/66 |

(Continued)

FOREIGN PATENT DOCUMENTS

| WO | 2013151797 A1 | 10/2013 |
| WO | 2015084755 A1 | 6/2015 |

(Continued)

OTHER PUBLICATIONS

"PCT Notification of Transmittal of the International Search Report and the Written Opinion", International Searching Authority, or the Declaration, dated Mar. 26, 2018 (dated Mar. 26, 2018), for International Application No. PCT/US2018/016548, 11pgs.

(Continued)

*Primary Examiner* — Mohammad A. Nilforoush
*Assistant Examiner* — Taylor S Rak (57) ABSTRACT

A method for generating transaction credentials for a user in a transaction, comprising: storing in a mobile device, an encrypted session key, and an encrypted user authentication credential; receiving an authorisation request; initiating a user authorisation process wherein in the event that the user is an authenticated user, the method comprises: decrypting the encrypted session key and encrypted user authentication credential; generating a transaction cryptogram in dependence on the user authentication credential and the session key; transmitting the transaction cryptogram and a user authentication status to a transaction processing entity for use in a transaction.

16 Claims, 7 Drawing Sheets

(51) Int. Cl.
*G06Q 20/32* (2012.01)
*G06Q 20/36* (2012.01)
*G06Q 40/02* (2012.01)
*G06Q 20/40* (2012.01)
*H04W 12/041* (2021.01)
*H04W 12/062* (2021.01)
*H04W 12/0433* (2021.01)
*G06F 8/60* (2018.01)

(52) U.S. Cl.
CPC ..... *G06Q 20/3674* (2013.01); *G06Q 20/3821* (2013.01); *G06Q 20/3823* (2013.01); *G06Q 20/4014* (2013.01); *G06Q 40/02* (2013.01); *H04L 9/0897* (2013.01); *H04W 12/041* (2021.01); *H04W 12/0433* (2021.01); *H04W 12/062* (2021.01); *G06F 8/60* (2013.01); *G06Q 2220/00* (2013.01); *H04L 2209/56* (2013.01); *H04L 2209/80* (2013.01)

(56) References Cited

U.S. PATENT DOCUMENTS

| | | | | |
|---|---|---|---|---|
| 2013/0262317 | A1* | 10/2013 | Collinge | G06Q 20/3552 705/71 |
| 2015/0019442 | A1* | 1/2015 | Hird | H04L 63/062 705/71 |
| 2017/0149570 | A1* | 5/2017 | Counterman | H04L 63/102 |

FOREIGN PATENT DOCUMENTS

| | | | | |
|---|---|---|---|---|
| WO | WO-2015084755 | A1* | 6/2015 | G06Q 20/322 |
| WO | 2016178074 | A1 | 11/2016 | |

OTHER PUBLICATIONS

"Communication: European Search Report", European Patent Office, dated May 16, 2017, for European Application No. 17157269.6-1871, 7 pp.

* cited by examiner

TRANSACTION CRYPTOGRAM

CROSS-REFERENCE TO RELATED APPLICATION

This application is a U.S. National Stage filing under 35 U.S.C. § 119, based on and claiming benefits of and priority to European Patent Application No. 17157269.6 filed on Feb. 21, 2017. The entire disclosure of the above application is incorporated herein by reference for all purposes.

TECHNICAL FIELD

The disclosure relates to a transaction cryptogram. In particular, the disclosure relates to the generation of transaction credentials for a user in a transaction.

BACKGROUND

Smart devices and smartphones are becoming more commonplace, with global smartphone sales increasing from under 200 million in 2009 to over 1,300 million in 2015. Improvements in mobile and communication technologies have also allowed for new and alternative uses of smart devices and smartphones. One example is the development of near field communication (NFC) technology and its use in contactless payment transactions. Many smartphones and credit and debit cards (EMV cards) are now equipped with NFC chips enabled to securely transmit payment details so a user may only 'touch' or 'tap' the phone or card to a point of sale terminal to process a payment transaction.

Previously, using NFC communication for payment transactions required devices to have secure element (SE) chips, which are used to securely store the payment credentials. This is certainly suitable for an EMV card produced by an issuer, such as the user's bank, as the issuer can use their preferred platform in the SE chip. However, in the case of mobile devices, one SE must be used by any number of issuers which may all have different preferred operating systems. Additionally, some mobile devices may not have secure elements, or issuers of payment transactions might not have access to secure elements on mobile devices. Consequently, a mobile device which is otherwise equipped for contactless payments or remote payments will not be able to enact such transactions.

An alternative to providing secure elements for payment transactions in mobile devices is host-based card emulation (HCE). When using HCE, the mobile phone acts like a smart card but without the need for SEs, as the payment application is held in the mobile operating system and credentials are stored in a remote 'cloud' data store, in a trusted environment on the mobile device or in an application on the device. In providing independence from secure elements issuers can produce user device applications and electronic wallets (e-wallets) to be used for both contactless NFC enabled payments and remote online payments, simplifying mobile device payment systems.

However, storing credentials outside of the SE requires alternative approaches to securing credentials for payment transactions. For example, the permanent card number (PAN) is typically stored locally in the mobile application which, although convenient, is not secure, so this data element is often 'tokenised', replacing the PAN with a non-sensitive value which has no discernible meaning without knowing how the non-sensitive value refers to the PAN. Another example is the creation and transfer of single use transaction keys from a remote secure data store, rather than the account-level payment credentials themselves, which enables the mobile application to perform only a single transaction.

In particular, the use of cryptographic keys is important for transaction systems where the card or user credentials are stored in a remote 'cloud' data store typically managed by the issuer. For each transaction, the card credentials, or variant thereof, must be made available to the payment application so that the device appears as a smart card. Consequently, cryptographic keys can be used to securely store and communicate card credentials, reducing the risk of fraud.

As is described by International Patent Publication No. WO2015084755, using dual, or multiple, cryptographic keys is an effective method of securing card and user credentials when employing cloud-based transaction systems. Using such a method, a single use key associated with a transaction account is produced by the remote cloud data store, otherwise referred to as the credentials management system, and communicated to the mobile device through a secure channel. The user is then required to input a PIN to be processed with the single use key to produce a session key, which then is used to generate a cryptogram. This cryptogram is then sent to a transaction management system which validates the cryptogram against a cryptogram provided by the credentials management system or generated by the transaction management system itself. If the cryptogram communicated by the mobile device is validated the transaction management system can communicate to the issuer that the transaction is allowed.

However, if the cryptogram cannot be validated by the transaction management system, the transaction management system also cannot establish whether this was due to an incorrect session key or incorrect PIN being used, thus indicating that the mobile device is not an authenticated device. In order to distinguish between these outcomes a second session key is generated at the mobile device which is based on at least the single use key but not the PIN. The second session key is then used to generate a second cryptogram which is sent to the transaction management system for validation. Consequently, if the first cryptogram cannot be validated but the second cryptogram can be validated, the transaction management system is able to communicate to the mobile device that the payment was declined due to an incorrect PIN. By using a first cryptogram to authenticate the mobile device and the user, and a second cryptogram to authenticate only the mobile device, the transaction management system can provide useful feedback to the mobile device if the transaction is declined. Additionally, this also can provide the issuer with information useful for considering whether to approve or deny a transaction. For example if the second cryptogram is validated but the first is not, such that it is clear the PIN provided was incorrect, the issuer may decide that other data available is suitable for authenticating the user.

The dual cryptogram system therefore can secure the system whilst providing useful information to the user or issuer on the status of the transaction. However, employing dual cryptograms increases processing power and system complexity. This may in turn increase the time taken to process the transaction, which decreases user satisfaction. This is particularly noticeable during NFC enabled payments and remote online payments which are provided primarily to decrease overall transaction time and reduce required user interaction.

Consequently, there is motivation to provide a system and method for mobile transactions which presents the security and additional transaction status information of the dual cryptogram system but which also reduces system complexity and processing power.

SUMMARY OF THE DISCLOSURE

Aspects and embodiments of the disclosure are set out in the accompanying claims.

According to a first aspect of the present disclosure there is provided a method for generating transaction credentials for a user in a transaction, comprising: storing in a mobile device, an encrypted session key, and an encrypted user authentication credential; receiving an authorisation request; initiating a user authentication process wherein in the event that the user is an authenticated user, the method comprises: decrypting the encrypted session key and encrypted user authentication credential; generating a transaction cryptogram in dependence on the user authentication credential and the session key; transmitting the transaction cryptogram and a user authentication status to a transaction processing entity for use in a transaction.

The present disclosure provides a method of generating transaction credentials in which a transaction cryptogram is generated and protected by a key which is known only to the sender and recipient. On receiving the transaction cryptogram from the sender, the recipient performs a validation/authentication process in which the key is used to re-compute the transaction cryptogram. If the transaction cryptogram received from the mobile device matches the transaction cryptogram generated by the recipient, the recipient may be assured that the message has not been altered during transmission.

The authorisation request relates to the transaction being processed and the request may originate from a user's mobile device, or a keystore stored thereon, or from a cloud based entity that is remotely located. The transaction processing entity may be a bank involved in the transaction or a transaction management server.

In the event that a user is not authenticated the mobile device may send a failure message to the user. A cryptogram may still be sent to the transaction processing entity for fraud tracking purposes. Since the user authentication process has failed in this instance the process will not have a user authentication credential to use during the transaction cryptogram generation process. A null value user authentication credential (e.g. "0000") may be used (to ensure the message that is sent is the same length as a successful authentication) or alternatively no equivalent credential may be used (in which case the transaction processing entity may regenerate a credential during the transaction authorisation process.

Optionally, therefore, in the event that the user is not authenticated the method comprises; decrypting the encrypted session key; generating a transaction cryptogram in dependence on a null user identifier and the session key; transmitting the transaction cryptogram and a user authentication status to a transaction processing entity for use in a transaction.

Optionally, the null user authentication credential comprises generic predetermined values, and is of the same length as the user authentication credential.

Optionally, in the event that the user is not authenticated the method comprises: decrypting the encrypted session key; generating a transaction cryptogram independent of a user authentication credential; transmitting the transaction cryptogram to a transaction processing entity for use in a transaction.

Optionally, wherein the method comprises a user registration process, the user registration process comprising; providing user information to a transaction processing entity, registering a transaction account associated with the user, at the transaction processing entity, downloading an application associated with the transaction processing entity to the mobile device.

Optionally, the session key and user authentication credential are associated with the user transaction account.

Optionally, the user registration process comprises registering a plurality of transaction accounts associated with the user, at the transaction processing entity.

Optionally, the method comprises storing an encrypted session key and an encrypted user authentication credential for each transaction account associated with the user.

Optionally, receiving an authorisation request comprises a user selecting the transaction account for use in generating transaction credentials for a user in a transaction.

Optionally, the transaction processing entity comprises an issuer, which issues payment credentials to a user associated with a user account registered with the transaction processing entity.

Optionally, the method comprises transmitting the transaction cryptogram and the user authorisation status from the application to a transaction management system (TMS).

Optionally, the user authentication credential is a consumer device cardholder verification method dynamic number (CDN).

Optionally, the method comprises transmitting the transaction cryptogram and the user authorisation status wirelessly.

Optionally, the user initiates the authorisation request by initiating a transaction using the mobile device.

Optionally, the authorisation request is received by an application on the mobile device which is arranged to: store the session key, the user authentication credential, and user information; verify a received user authentication request against the stored user information, and; to generate the user authentication status.

Optionally, the user authentication process comprises communicating the user authentication status to the user through a display on the mobile device.

Optionally, in the event that the user is not authenticated the user authentication process comprises displaying a request for the user to reattempt user authentication.

Optionally, the user authentication process comprises recording how many user authentication attempts have been made and, after a third user authentication attempt, communicating the user authentication status and making no further requests for the user to reattempt user authentication.

Optionally, the user authentication process may comprise any of the following; measurement of biometric information, personal identification number verification, personal information verification and signature verification.

Optionally, the transaction is a payment transaction.

Optionally, the method is performed on a cloud-based network.

According to another aspect of the present disclosure there is provided a system for generating transaction credentials for a user in a transaction, comprising: a mobile device arranged to; store an encrypted session key, and an encrypted user authentication credential; and receive an authorisation request and initiate a user authentication process; wherein in the event that the user is an authenticated user the mobile device is also arranged to; decrypt the encrypted session key and encrypted user authentication credential; and generate a transaction cryptogram in dependence on the user authentication credential and the session key; and transmit the transaction cryptogram and a user authentication status to a transaction processing entity for use in a transaction.

According to a further aspect of the present disclosure there is provided a mobile device arranged for generating transaction credentials for a user in a transaction, the mobile device comprising: a memory arranged to store an encrypted session key, and an encrypted user authentication credential, a processor arranged to initiate an authorisation request, to decrypt the encrypted session key and encrypted user authentication credential, and to generate a transaction cryptogram in dependence on the user authentication credential and the session key; a transmitting device arranged to transmit the transaction cryptogram to a transaction processing entity for use in a transaction.

The present disclosure extends to a computer program product comprising instructions which, when the program is executed by a computer, cause the computer to carry out the above method and to a computer-readable storage medium comprising instructions which, when executed by a computer, cause the computer to carry out the above method.

BRIEF DESCRIPTION OF THE DRAWINGS

The scope of the present disclosure is best understood from the following detailed description of the exemplary embodiments when read in conjunction with the accompanying drawings. Included in the drawings are the following figures.

DETAILED DESCRIPTION

Figure 1:
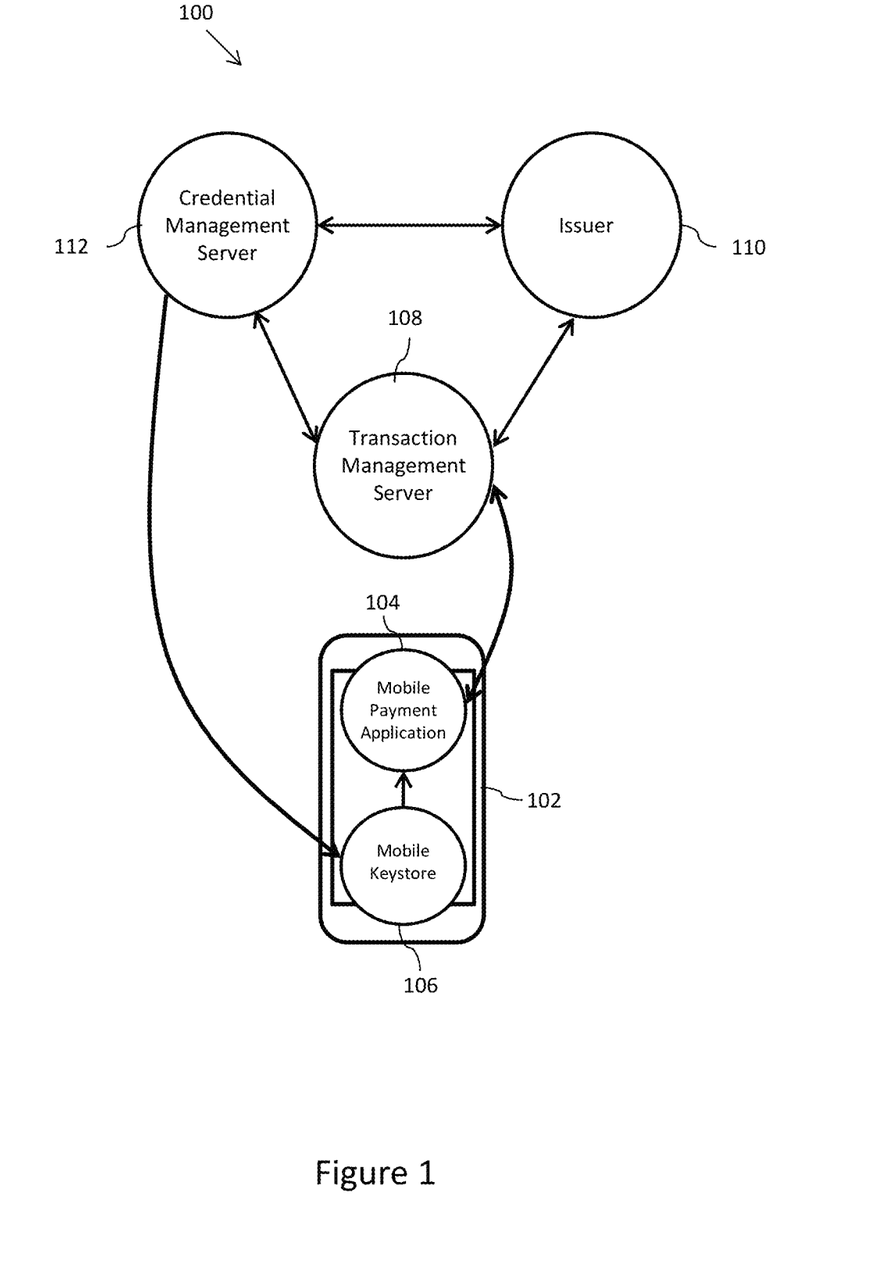
FIG. 1 illustrates a high level system architecture for processing payment transactions using a transaction system, in accordance with an embodiment of the disclosure.

FIG. 1 illustrates a high level system architecture 100 for processing transactions on a mobile device 102 comprising a mobile application 104 and a mobile keystore 106, without the use of secure element. The system 100 may also comprise a Transaction Management Server (TMS) 108, which is in communication with the mobile application 104, an Issuer 110 and a Credential Management Server (CMS) 112. The communication channels are taken to be secured.

The mobile device 102 may be any type of mobile computing device which can execute the required functions for performing a transaction as will be described further. The mobile device may or may not comprise a secure element, which is not necessary for implementing a transaction according to embodiments of the present disclosure but may be employed for additional security. For example, the mobile device may be a smart phone, wearable smart device or mobile computer such as a tablet. The mobile payment application 104 is downloaded and run on the mobile device 102. The mobile payment application 104 may be provided by the Issuer 110, or alternatively may be provided by a third party. It is possible that the mobile device 102 may comprise a number of mobile payment applications, all of which are in communication with the mobile keystore 106. In this way the user of the mobile device 102 may select the mobile payment application 104 most suitable for a particular transaction. In addition, the mobile payment application 104 may store information associated with the user or user account, for example the user billing address and a tokenised PAN. Furthermore, in an arrangement of the disclosure, the mobile payment application 104 may store and maintain the Application Transaction Counter (ATC) which provides a sequential reference to each transaction which is initiated on the mobile device 102. The mobile payment application 104 is in bi-directional communication with the CMS 108, and may use multiple communication channels, such as dual channel communication which increases the security of data transmission. The mobile keystore 106 is in communication with the mobile payment application 104.

The TMS 108 may be one or multiple computing devices provisioned via hardware and software to perform functions required for processing a single cryptogram transaction, as will be discussed further. The TMS 108 may comprise receiving and transmitting units, a processor, account database, and a memory storage unit. The TMS 108 may be configured to receive data through one or multiple communication channels from the CMS 112, Issuer 110 and mobile payment application 104, and initiate a processing function. The TMS 108 may be configured to process received and/or stored data and perform functions, such as encryption, generation of cryptograms and validation of cryptograms. The TMS 108 may be configured to store received data associated with a user account, including keys, transaction data or personal information, in the account database, and recall data from the account database. The account database is configured to store information for a plurality of user accounts. In embodiments of the present disclosure the TMS 108 does not transmit data during a transaction to the mobile device 102 and instead will process authorisation requests from the merchant involved in the transaction that will contain data and cryptograms from the payment application 104.

The Issuer 110 may be an institution, for example a financial institution such as a bank, or a consumer institution such as a shop, which issues payment credentials to a consumer associated with a transaction account registered with the institution. The Issuer 110 comprises at least an Issuer server to perform the actions required for processing a payment transaction as recited herein. It is to be understood that this is not limiting, and the Issuer server may also perform a number of additional actions not required for the payment transaction recited herein, or for alternative possible embodiments of transactions, including cloud-based transactions. Furthermore, the Issuer server may comprise a number of servers, computational devices and hardware and software units. The Issuer 110 may supply payment credentials to the TMS 108 or CMS 112, such as the primary account number (PAN), the card security code (CSC) or card expiration date. The payment credentials should be taken to be any data or information relating to and/or used in a payment transaction, and may include cryptograms, cryptographic keys and notification messages. The Issuer server may also comprise a user account database, in which user and user device information, data and payment transaction information is stored. This may be in addition to the account database on the TMS 108. However, in another arrangement of the disclosure, the Issuer user account database may be the account database stored on the TMS 108.

The CMS 112 may be one or multiple computing devices provisioned via hardware and software to perform functions required for processing a single cryptogram transaction, as will be discussed further. The CMS 112 may comprise receiving and transmitting units, a processor and a memory storage unit. The CMS 112 may be configured to receive data through one or multiple communication channels from the TMS 112 or the Issuer 110. The CMS 112 may be configured to process received and/or stored data and perform functions, such as encryption and generation of cryptograms. The CMS 112 may be configured to securely store payment credentials and cryptographic keys, and provide these to the TMS 108 when required. Within the arrangements described herein cryptographic operations may be performed by the CMS 112, TMS 108 or an account enablement system (AES). Keys may be supplied by the issuer 110 or, since cryptographic operations will be performed by one or more of the CMS/TMS/AES, the issuer 110 may arrange for the AES to generate cryptographic keys for the CMS and/or TMS rather than supply issuer master keys (IMKs). Alternatively, the TMS 108 may receive issuer master keys (IMKs) directly from the account enablement system (AES). The CMS 112 also securely communicates payment credentials and cryptographic keys directly to the mobile keystore 106.

Figure 2:
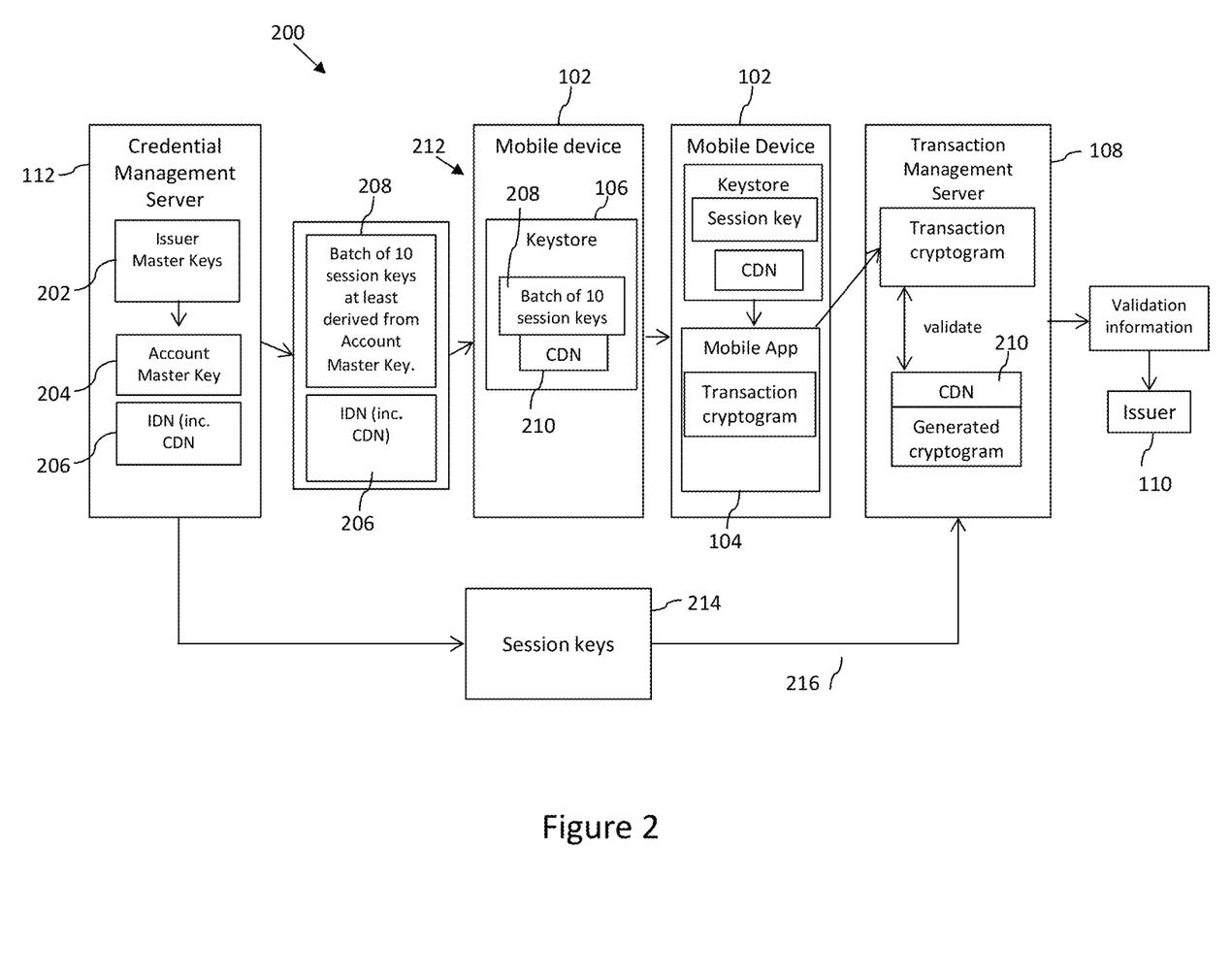
FIG. 2 is a block diagram illustrating a system process for a single cryptogram transaction system, in accordance with an embodiment of the disclosure.

FIG. 2 illustrates a process 200 within a transaction system, arranged to perform a transaction using a single cryptogram, according to an embodiment of the disclosure. The process 200 shown in FIG. 2 reads left to right, beginning at the CMS 112. It is assumed that the account holder has initiated a payment transaction using the mobile application 104.

In the embodiment of the disclosure illustrated by FIG. 2, the CMS 112 has Issuer Master Keys (IMK) 202 stored. Although not shown here, the IMKs 202 are, in the embodiment shown in FIG. 2, issued by the Issuer, and are stored in the memory storage unit of the CMS 112. The IMKs 202 can be used together with payment credential information to derive Account Master Keys (AMKs) 204, ICC Dynamic Numbers (IDN) 206 and other required keys. The AMKs 204 is unique to each payment account, and are equivalent to Card Master Keys—they are simply referred to as Account Master Keys 204 herein to emphasise that the transaction is occurring through a mobile device rather than a payment card. The AMKs are associated with each account during the registration or personalisation stage of account set-up and thus are unique to each account. They are used to generate unique session keys for each transaction. The CMS 112 may also derive a user identifier, such as a consumer device cardholder verification method dynamic number (CDN), as part of the IDN 206. The CDN is a number associated with the payment account, used for validating users during an authentication process as will be discussed further. The CDN may be a temporary number, which is generated and supplied by the CMS. The IDN and CDN may not be stored directly, but derived by the TMS and CMS from the associated Issuer Master Key 202. As such, the TMS 108 may be provided with Issuer Master Keys (IMK) 202, Account Master Keys (AMKs) 204 and ICC Dynamic Numbers (IDN) 206 by the Issuer 110, or the CMS 112. Alternatively, the TMS 108 may be provided with only the IMKs 202 from the Issuer 110 or CMS 112 and derive the AMKs 204 IDN 206. Nevertheless, the CMS 112 and TMS 108 are synchronised such that the CMS 112 can communicate required keys, payment credentials and/or IDN 206 to the TMS 108 if required to do so.

The CMS 112 is arranged to derive batches of multiple session keys for use in payment transactions 208 from the AMK 204. The session keys are unique, temporary keys for use in a single transaction, which are no longer valid after the end of the transaction. As is shown in FIG. 2, batches of 10 session keys 208 are communicated to the mobile device 102. However, it should be understood that this is not limiting and more or fewer session keys may be derived and communicated to the mobile device 102. The CMS 112 may also communicate the IDN, including the CDN 210 to the mobile device.

Upon receipt at the mobile device 102, the batch of session keys for use in payment transactions and the CDN are then stored 212 in the mobile keystore 106. The session keys and CDN values may be encrypted for communication to the mobile keystore 106 and may be stored in encrypted form. It is possible that the mobile keystore 106 may decrypt the session keys and CDN values on receipt and re-encrypt them according to the encryption methods of the mobile keystore 106. However, this is not fundamental to the disclosure, and may differ depending on the configuration of the mobile keystore 106. The mobile payment application 104 may specify user authentication requirements for accessing and decrypting the session keys and CDN. For example, to access and decrypt a session key and the CDN, the mobile payment application 104 may require the account holder to enter a PIN. The authentication may be enforced by the mobile keystore 106. In other embodiments different types of authentication may be used, which may include but not be limited to, entering personal information such as date of birth, entering account information, entering a password, entering a PIN, answering a predetermined question, measurement of biometric data such as a fingerprint scan, a retinal pattern scan, signature input, face or voice recognition. It is to be understood that any form of appropriate authentication could be implemented to access the mobile keystore 106.

Following on from a successful authentication, the mobile keystore 106 decrypts and releases a session key for use in processing the initiated payment transaction. As a result, a session key and the CDN are released to the mobile payment application 104. The mobile payment application 104 then uses the session key to produce a transaction cryptogram, which can be understood as a type of Message Authentication Code (MAC), with the CDN included in the cryptogram 214.

The transaction cryptogram generated by the mobile payment application 104. The authenticity of the transaction message is thus protected by a key which is known only to the sender and recipient. In this case, the user is provided with a key which is known by the TMS 108 and by the CMS 112 and may also be known by the Issuer 110. Any of the methods to generate a transaction cryptogram, as would be known by the skilled person, are applicable. On receiving the transaction cryptogram from the sender, the recipient performs a validation/authentication process in which the key is used to re-compute the transaction cryptogram. If the transaction cryptogram received from the mobile device matches the transaction cryptogram generated by the recipient, the recipient may be assured that the message has not been altered during transmission.

If the cardholder authentication is not successful the mobile keystore 106 still decrypts and releases a session key for processing the transaction, however the CDN will not be released, and instead a null CDN value may be used in the transaction cryptogram. In an alternative embodiment of the disclosure, the transaction cryptogram is generated without a CDN value being used when the cardholder authentication is not successful. The mobile keystore 106 communicates to the mobile payment application 104 that the authentication was not successful, which may then also be communicated to the user. However, in an arrangement of the disclosure, the failure of the user authentication process may only be communicated to the user subsequently to the mobile payment application 104 receiving a processing notification indicating that the payment transaction failed.

In another arrangement of the disclosure, if the authentication is not successful, the session key and CDN are not decrypted and released and the mobile keystore 106 communicates to the mobile payment application 104 that the authentication was not successful. Thereafter, the user may either be informed that the authentication failed and the transaction attempt has thus failed, or informed that the authentication failed and be prompted again for authentication. The second authentication attempt may use the identical authentication method of the initial authentication attempt. Alternatively, the mobile payment application 104 may require that a different authentication method is used, or additional authentication is required. For example, a user may be required to enter their PIN and their date of birth. In addition, the mobile payment application 104 may specify how many authentication attempts are allowed before the transaction attempt is cancelled, or the generic predetermined CDN value is used. Furthermore, if the number of allowed authentication attempts is exceeded, the mobile payment application 104 may communicate to the Issuer 110 that the user has had a number of unsuccessful authentication attempts, such that the Issuer 110 may block any further requested payment transactions for a predetermined time period, or may use additional information to assess the likelihood that a fraudulent user or transaction is being attempted.

Subsequent to the authentication process described above, the transaction notification, comprising at least the transaction cryptogram is communicated 216 to the TMS 108. As noted above, the TMS 108 validates the received transaction cryptogram by generating its own cryptogram from the data received from the mobile device, and stored client information, and subsequently comparing the transaction cryptogram received against the generated cryptogram. In more detail it is noted that the transaction notification comprises user information sufficient for the TMS 108 to identify the user account associated with the initiated transaction, to retrieve from the account database the user payment credentials required to validate the received transaction cryptogram and authorise the transaction. In addition, the transaction notification may comprise details of the transaction, for example date, location and amount for storage in the account database. Furthermore, the transaction notification includes a notification of whether the user authentication was successful or not. If the TMS 108 receives a notification that the user authentication was successful, then the TMS 108 will use the CDN associated with the user account, derived from the IDN. Whereas, if the transaction notification alerts the TMS 108 that the user authentication was not successful, the TMS 108 will assume the null value, or in alternative embodiments will not include a CDN value.

On receiving the transaction notification, the TMS 108 will identify the user account and retrieve the associated payment credentials required for generating the validation cryptogram. The TMS 108 will generate the validation cryptogram for validation against the cryptogram received from the mobile payment application 104. If the generated validation cryptogram does not match the received cryptogram it is an indication that the mobile device 102 or mobile payment application 104 is not authenticated, as the user authentication status is already known.

The validation information, such as the user authentication status and mobile device 102 authentication status, may then be communicated to the Issuer 110. The Issuer 110 can use this information to process or reject the payment transaction, and subsequently to send a corresponding transaction processing notification to the TMS 108 to be sent to the mobile payment application 104.

The process 200 as illustrated by FIG. 2 can be used for contactless payments, such as holding a mobile device 102 proximal to a NFC enabled point of sale terminal. Moreover, the process 200 may also be used for digital secure remote payments (DSRP), in which a mobile device 102 is connected to the internet through a wireless network and where the transaction is performed online. For example, a user may be on a merchant website, and use the mobile payment application 104 or an external Issuer system provided by the merchant website to pay for an item. Both contactless and digital secure remote payments can employ the process 200 as described by FIG. 2 of a single cryptogram mobile transaction.

Figure 3:
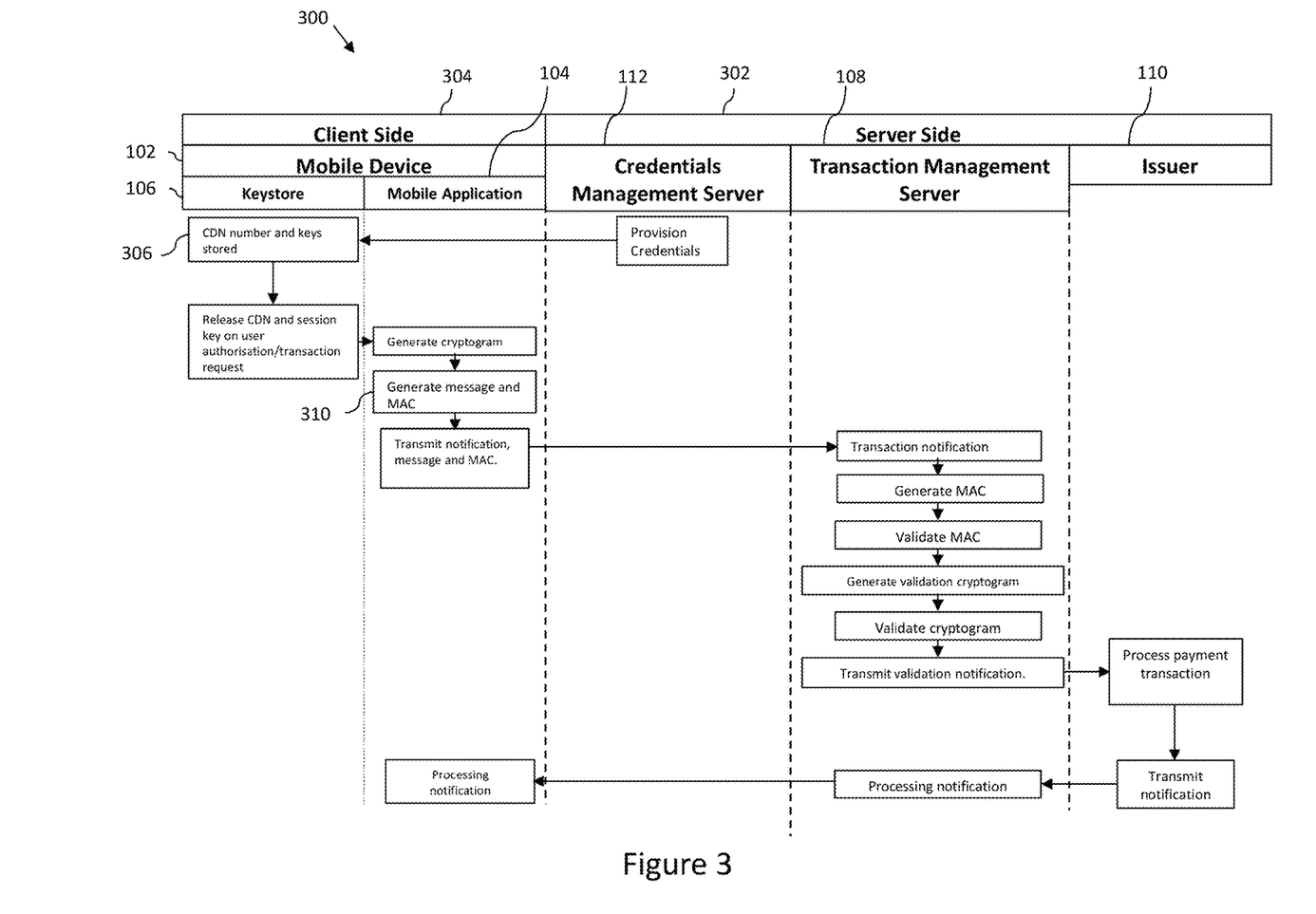
FIG. 3 is a flow diagram illustrating a process for the transmittal and validation of a single cryptogram for the processing of a transaction according to an embodiment of the disclosure.

The process 200 of FIG. 2 is shown in the flow diagram 300 of FIG. 3. Also shown in FIG. 3 is the TMS 108 and the Issuer 110 located on the server side 302, and the mobile device 102 comprising the mobile keystore 106 and mobile payment application 104 located on the user side 304.

In FIG. 3 payment credentials, stored on the server side 302 either by the CMS 112 or TMS 108, or in another arrangement in an appropriate secured server, are sent to the mobile keystore 106. The payment credentials are then stored 306 by the mobile keystore 106. Once payment credentials have been stored and encrypted in the mobile keystore 106, the user is able to use the mobile device 102 to partake in mobile transactions. The user may initiate a payment transaction for example by opening the mobile payment application 104 on the mobile device 102 and bringing the mobile device 102 into contact with a merchant NFC point of sale terminal. The mobile payment application 104 will then communicate to the mobile keystore 106 that a session key and the CDN is required, and the mobile keystore 106 will prompt the user for authentication. This may occur through the mobile payment application 104. As shown in FIG. 3, if the user initiates a transaction and if the mobile keystore 106 decrypts and releases the CDN, the user has been successfully authenticated. On receiving a CDN value and session key the mobile payment application 104 can then generate a message comprising the transaction cryptogram which includes the CDN value. A transaction notification as previously described is then sent to the TMS 108. On receiving this, the TMS 108 generates a validation cryptogram for mobile device 102 validation. The TMS 108 then communicates a validation notification 318 to the Issuer 110, from which the Issuer can assess whether to allow (/authorise) or reject the payment transaction. FIG. 3 illustrates the case that the validation of the mobile device 102 and user authentication was successful, and therefore the Issuer 110 processes the payment transaction 320. Once the payment has been processed, the Issuer 110 transmits a transaction status notification 322 to the TMS 108 which is communicated to the mobile payment application 104.

Nevertheless, it may be that the user is not successfully authenticated by the mobile keystore 106. If the user is not successfully authenticated, the mobile keystore will decrypt and release a session key and may also release a null value for the CDN. The null CDN value will match the actual CDN value in length, but will be comprised of generic, predetermined values. For example, a null CDN value may be four zeros. This null value will be generated by the Issuer 110 and communicated to the mobile keystore 106. Alternatively, no CDN value will be released, in which case the transaction cryptogram will be generated without a CDN value.

Figure 4:
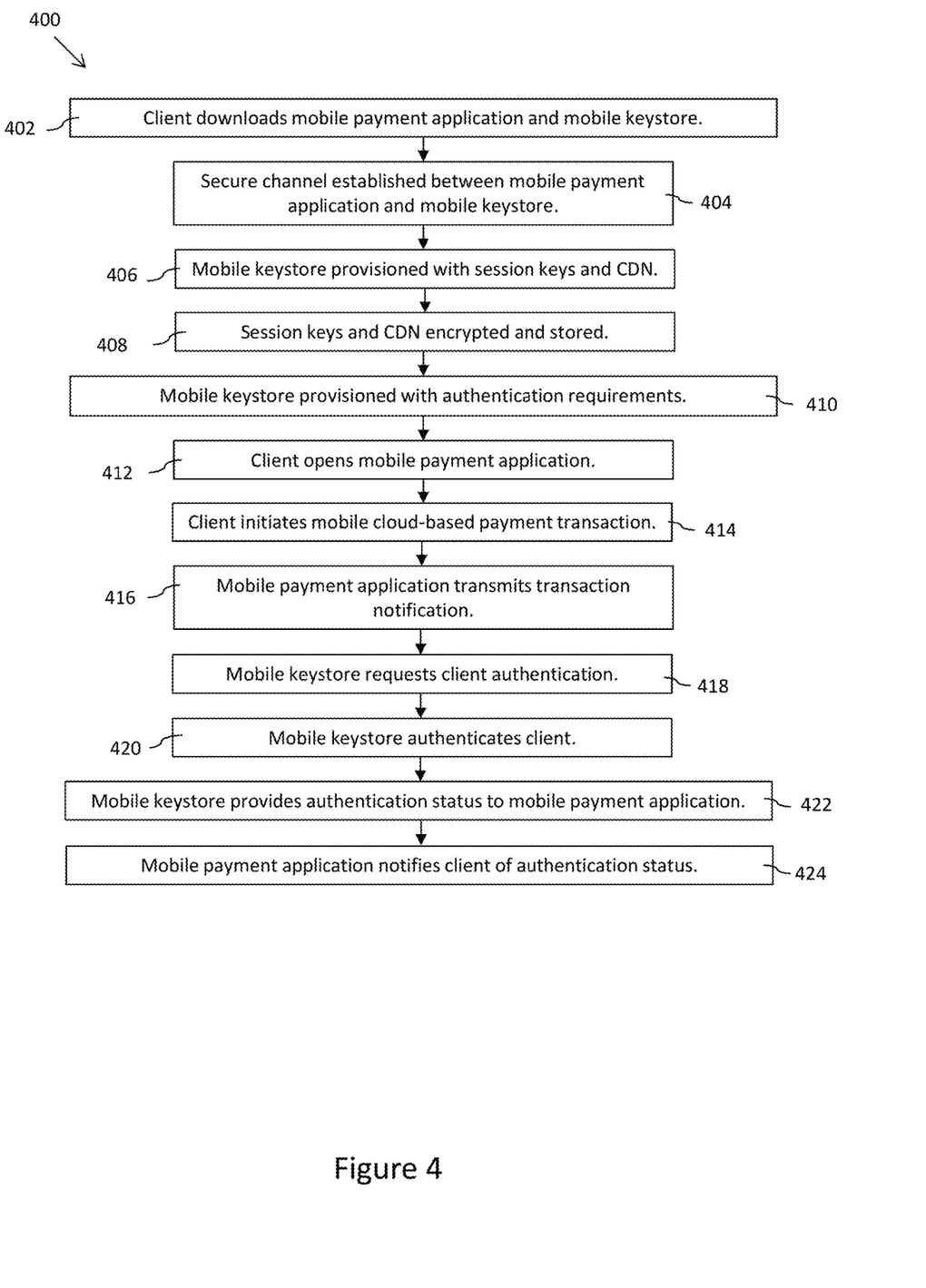
FIG. 4 illustrates a flow process 400 for the initiation of a transaction, on the user side, according to an embodiment of the disclosure.

In another arrangement of the disclosure, on unsuccessful user authentication attempts the mobile keystore 106 may prompt for further authentication attempts before releasing the appropriate CDN value, or no CDN value. The amount of allowed authentication attempts before assuming the null CDN value, or assuming no CDN value for the generation of the transaction cryptogram, may be set either by the Issuer, user, or mobile keystore 106. FIG. 4 illustrates a flow process 400 for the initiation of a single cryptogram transaction, on the user side 304. In step 402 the user downloads a mobile payment application 104 to the mobile device 102. The user is then required to input user account details into the mobile payment application 104, such that the mobile payment application 104 is able to set-up secure communication channels with the payment account Issuer 110 and associated TMS and CMS, and retrieve appropriate data and information if required.

Additionally in step 402 the user downloads a mobile keystore 106, provided by a third party. However, in another arrangement the mobile keystore 106 may be distributed and provided by an Issuer 110. Following on from this, in step 404, a secure communication channel is established between the mobile payment application 104 and the mobile keystore 106.

Next, shown in step 406, the mobile keystore 106 is provisioned with a batch of session keys and a CDN from the Issuer 110 on the server side. This is not a direct provisioning, but through the CMS 112. The mobile keystore 106 may also be provisioned with additional relevant information from the Issuer 110, CMS 112 and/or TMS 108.

Following on from this, the session keys and CDN are stored in the mobile keystore 106, which is shown in step 408. Next, the mobile keystore is provisioned with the authentication requirements, which are provided by the mobile payment application 106. The authentication requirements may have associated transaction dependent rules. For example, the mobile payment application 106 may specify that fingerprint recognition is required for a transaction below £30, whereas above £30, both fingerprint and facial recognition is required. Additionally, authentication requests may be user account dependent. For example, if the user selects their debit account for the mobile transaction, they may be required to enter a PIN, whereas for a merchant loyalty card, they may be required to enter personal details such as their date of birth.

Next, in step 412, the user opens the mobile payment application 104 on the mobile device 102. Subsequently, the user initiates a transaction, as shown by step 414. Initiating a mobile transaction may comprise bringing the mobile device 104 into a proximal distance with an appropriate point of sale terminal. The mobile and point of sale terminal comprise suitable hardware to establish a communication connection, such as radio or Bluetooth communication. Additionally, the initiation may comprise the point of sale terminal communicating the transaction details, such as transaction amount, to the mobile device. In another arrangement of the disclosure, the mobile payment application 104 may open automatically when the mobile device is brought into proximity with an appropriate point of sale terminal. In an alternative implementation, the transaction is initiated through a merchant online website, such that the user selects an option on the merchant website to process the payment transaction through the mobile payment application 104 on the mobile device 102. In this implementation, the mobile payment application 104 may open automatically after initiation of the payment transaction on the merchant website. Alternatively, the mobile payment application 104 may not open on the mobile device 102, but be allowed to access the mobile device 102 display to prompt for user authentication. In an alternative arrangement, the mobile payment application 104 may not open but still perform the subsequent steps of the flow process 400 of FIG. 4, as will be described below.

Next, in step 416, the mobile payment application 104 transmits a transaction notification to the mobile keystore 106. The notification may comprise a request for a session key and the CDN. Also, the notification may comprise other required transaction information, such as transaction amount. Following on from this, in step 418, the mobile keystore 106 requests user authentication. However, in another arrangement the user authentication may be requested through the mobile payment application 104. On attempted user authentication, the mobile keystore 106 will verify the user authentication, shown by step 420, and subsequently in step 422, the mobile keystore 106 provides the authentication status to the mobile payment application 104. For example, if the user inputs incorrect authentication information, the mobile keystore 106 may transmit the status 'authentication failed' to the mobile payment application 104. Following on from this, shown by step 424, the mobile payment application 104 then notifies the user of the authentication status. However, in another arrangement, the mobile keystore 106 may be able to directly notify the user of the authentication status. Additionally, in another arrangement, the mobile keystore 106 or mobile payment application 104 only transmits a notification status if the authentication was incorrect. In yet another arrangement, a notification status of the user authentication status is transmitted only if a processing notification is received from the Issuer which indicates that the payment transaction has failed due to an unsuccessful user authorisation attempt.

The mobile payment application 104 or mobile keystore 106 may be configured to additionally prompt the user to reattempt user authentication if the initial authentication attempt has failed.

Figure 5:
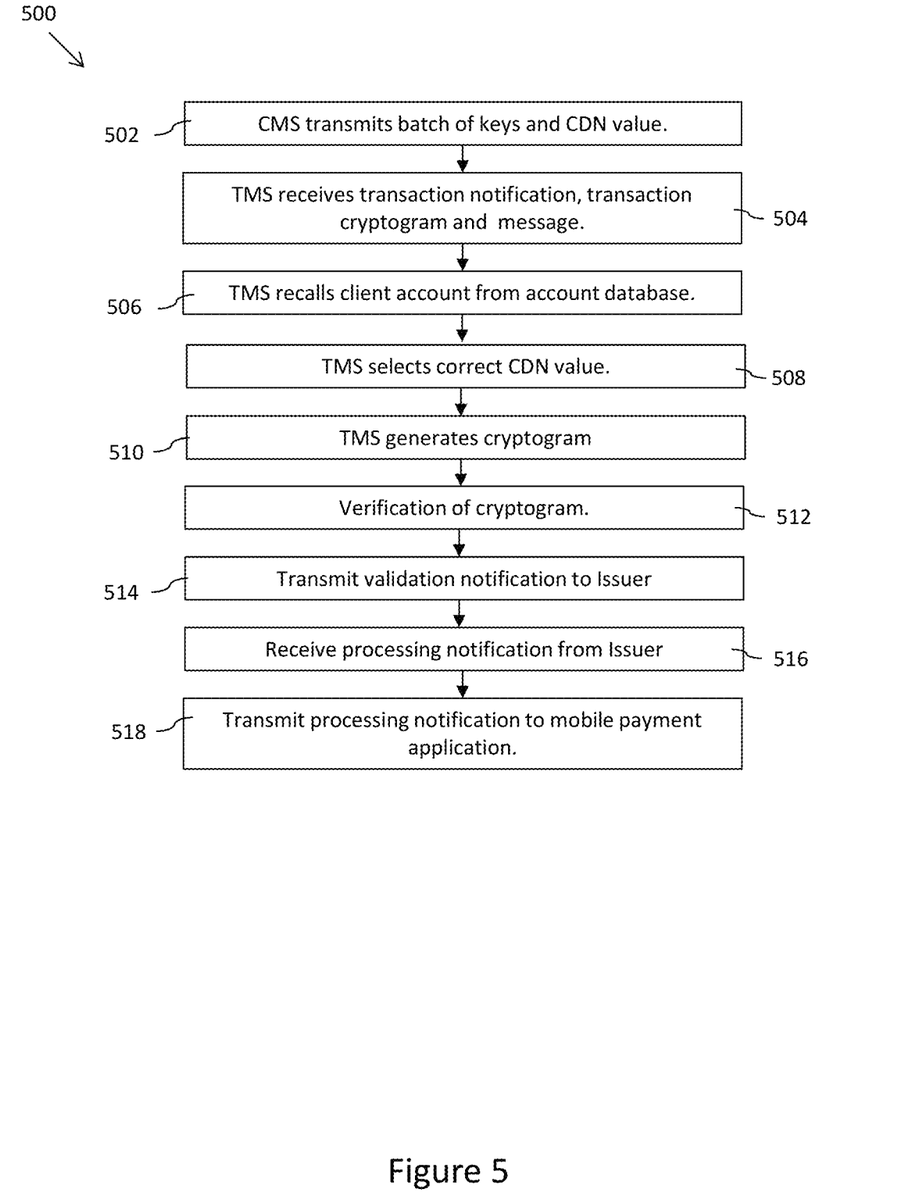
FIG. 5 is a flow diagram 500 showing the TMS 108 process for a transaction according to an embodiment of the disclosure.

FIG. 5 is a flow diagram 500 showing the process for a transaction according to an embodiment of the disclosure. In a first step 502 the CMS 112 transmits a batch of session keys and CDN to the mobile keystore 106 of a mobile device 102 for storage. The batch of session keys and CDN will be associated with a user account stored in the account database of the CMS 112 and/or TMS 108, where the CMS 112 and TMS 108 are in communication and synchronised. The user account is previously established during a user set-up stage. This may be when the user registers for an account with the Issuer 110 and the Issuer 110 generates user account details and information. During user account set-up the user account may have a user account identification value associated with the user account. The user account identification value may be a payment credential such as the account number, the PAN or tokenised PAN. The user account identification value may also be an independent value given by the Issuer 110. Nevertheless, it is assumed for the embodiments of this disclosure that the user account on the account database is available and populated with required user information including the user account identification value, data and payment credentials. When the user downloads and sets-up the mobile payment application 104 on their mobile device 102, additional data and information may be collected from the mobile device 102 and stored in the account database 104 for later verification and security purposes.

In step 504, the TMS 108 receives a transaction notification, comprising at least the cryptogram including the CDN value, or in an alternative embodiment the transaction cryptogram. The transaction notification will also include information associated with the user authentication status and may also include information associated with the transaction, such as the user account identification value, the Application Transaction Counter (ATC) value, and the transaction amount. Next, in step 506, using the user account identification value the TMS 108 can retrieve the user payment credentials, such as the session keys and IDN. Subsequently in step 508, the TMS 108 is arranged to select the correct value of the CDN according to the received information associated with user authentication status. If the user authentication is successful, the TMS 108 derives the CDN from an Issuer Master Key. The CDN may be the rightmost 4 bytes of the IDN or derived separately to the IDN. However, if the user authentication was unsuccessful, the TMS 108 may use a null CDN value, for example a value of four zeros, or may not use a CDN value for generating the validation cryptogram. Consequently, the CDN value used by the TMS 108 will match the CDN value used by the mobile payment application 104 to generate the transaction cryptogram.

Next, in step 510, the TMS 108 generates the validation cryptogram. In an arrangement where the TMS 108 has stored the session keys sent to the mobile keystore 106, it may simply retrieve the session keys for use in cryptogram generation. In another arrangement, where the TMS 108 has not stored the session keys, it may derive the session keys using the stored Account Master Keys or Card Master Keys or using the Issuer Master Key itself.

Once the TMS 108 has generated the cryptogram, it validates the received cryptogram against the generated cryptogram in order to verify the mobile device 102. This is shown in step 512. As the user authentication status is already known, if the cryptograms do not validate it is clear that the mobile device 102 may not be a verified mobile device 102 and thus a fraudulent transaction may have been initiated.

In step 514, the TMS 108 transmits a validation notification to the Issuer 110. The validation notification comprises at least the user authentication status and the mobile device 102 authentication status.

In step 516, the TMS 108 receives the processing notification from the Issuer 110. After receiving the validation notification from the TMS 108 the Issuer 110 will allow or deny the transaction, and if the payment transaction is allowed then the Issuer 110 will process the payment transaction. Consequently, the processing notification comprises at least the payment transaction status (whether the payment transaction was processed or rejected). The TMS 108 processes this message and stores any required information in the user account database. For example, if the payment transaction was successful this may be data regarding the payment such as amount, location or merchant. The TMS 108 transmits the authorisation response to the merchant, as can be seen in step 518. The mobile payment application 104 may alert the user that the payment transaction was successful or unsuccessful. The mobile payment 104 may also process the processing notification and store any required information and update information if necessary. The Application Transaction Counter value is updated for successful and unsuccessful transactions.

Figure 6:
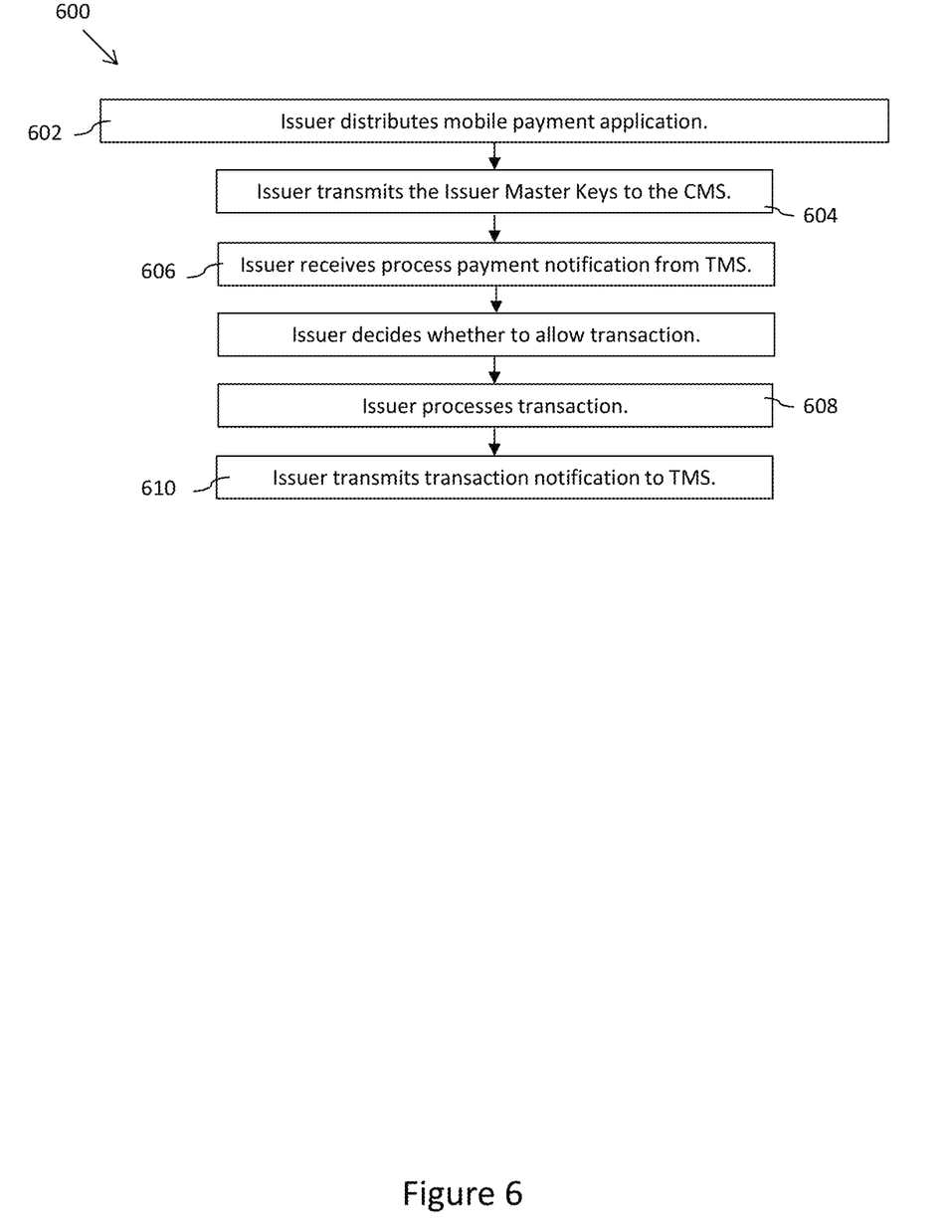
FIG. 6 is a flow diagram 600 showing the Issuer 110 process for a transaction according to an embodiment of the disclosure.

FIG. 6 is a flow diagram 600 showing the Issuer 110 process for a transaction according to an embodiment of the disclosure. In the first step 602, the Issuer 110 distributes a mobile payment application 104 for download by mobile devices 102. However, in an alternative arrangement, the mobile payment application 104 may be distributed by a third party. Following on from this the Issuer 110 transmits the Issuer Master Keys to the CMS 112, which is shown in step 604, for generating the Account Master Keys which are unique to each account. In an alternative arrangement, the Issuer 110 may generate the Account Master Keys and transmit the Account Master Keys to the CMS 112. It is noted that the TMS is provided with the Issuer Master Keys in order to be able to verify transaction cryptograms that are generated by the mobile payment application during a payment transaction. Next, in step 606, the Issuer 110 will receive a process payment notification from the TMS 108. The process payment notification at least comprises the validation status of the mobile device 102 and the user authentication status. The process payment notification may also comprise other suitable data that may be used by the Issuer 110 to validate the transaction data and/or process approval or refusal of the transaction. [As discussed earlier, within the arrangements described herein cryptographic operations may be performed by the CMS 112, TMS 108 or an account enablement system (AES). Keys may be supplied by the Issuer 110 as described above or, since cryptographic operations will be performed by one or more of the CMS/TMS/AES, the issuer 110 may arrange for the AES to generate cryptographic keys for the CMS and/or TMS rather than supply issuer master keys (IMKs).

In step 608, the Issuer 110 may use the information and data transmitted in the process payment notification to decide whether to allow or deny the transaction. Subsequently, as is shown in step 608 of the embodiment shown in FIG. 6, the Issuer 110 processes the transaction. The Issuer 110 then transmits a transaction notification to the TMS 108 to be passed on to the mobile payment application 104.

Figure 7A:
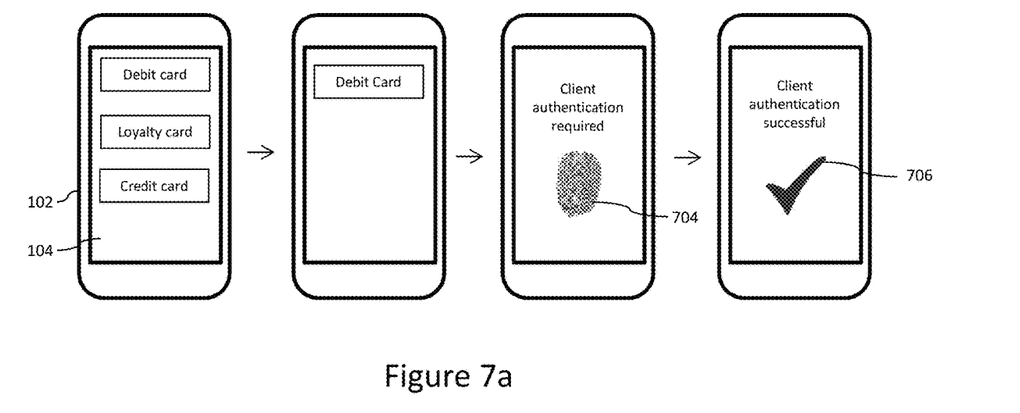
FIG. 7a illustrates a plurality of user accounts being available when using the single cryptogram transaction system, according to an embodiment of the disclosure.
Figure 7B:
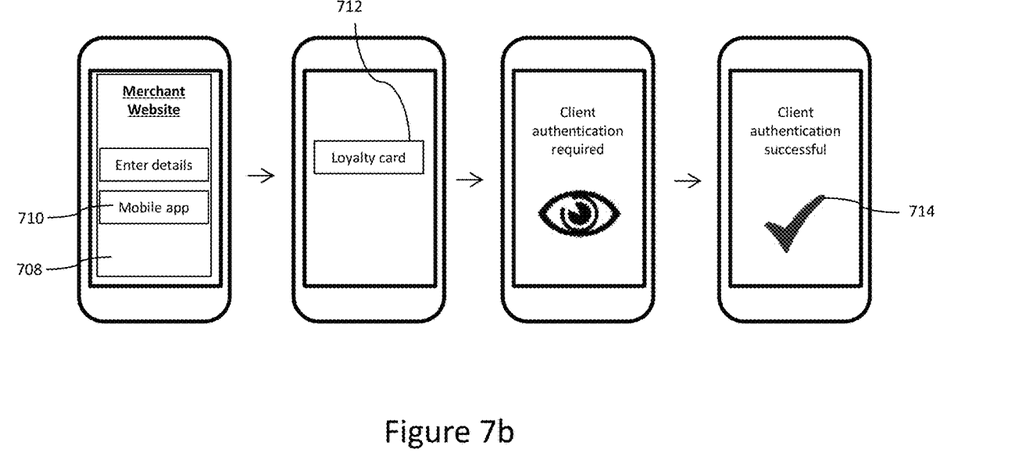
FIG. 7b illustrates a plurality of user accounts being available when using the single cryptogram transaction system, according to an embodiment of the disclosure.

FIGS. 7a and 7b illustrate an embodiment of the single cryptogram for a transaction wherein a plurality of user accounts are available for use in the mobile payment application.

In FIG. 7a, the user has opened the mobile payment application 104 on their mobile device 102 and is presented with account payment options 700. Each of the account payment options 700 is pre-registered with the Issuer 110 and the mobile payment application 104. Furthermore, each card payment option 700 is associated with a separate user account and separate user account identification value. In an arrangement, each of the card payment options 700 may not be registered with the same Issuer 110. In this arrangement, the mobile payment application 104 may be configured to communicate with the TMS 108, Issuer 110 and CMS 112 according to which account payment option has been selected. It is possible that different types of account payment options are available. For example, as can been seen in FIGS. 7a and 7b, the user may choose between the accounts associated with their debit card, credit card or a merchant loyalty card. It is to be understood that any number of user accounts may be available in the account payment options 700, and types may include, although the following examples should not be taken as exhaustive or limiting, debit accounts, credit accounts, prepaid card accounts and loyalty card accounts.

In FIG. 7a the user selects the account associated with their debit card. As the card is pre-registered on the mobile payment application 104 the user is not required to input any additional information. The user then touches their mobile device 102 to a suitable point of sale terminal (not shown in FIG. 7a) to initiate a single cryptogram transaction, according to the embodiments of the disclosure as previously described. The mobile payment application 104 will transmit a transaction notification to the mobile keystore 106 which comprises at least data to identify which user account is being used, such that the mobile keystore 106 may use the correct user authentication method, session keys and CDN value, or whether no CDN value is being used on unsuccessful user authentication. The mobile keystore then prompts for user authentication on the mobile device 102, which in FIG. 7a, is a fingerprint scan 704. The user is then informed whether or not the authentication was successful, as can be seen on the mobile device in FIG. 7a, 706.

In FIG. 7b, the user has initiated a single cryptogram transaction through an online merchant store. As can be seen in the first mobile device 708, the user is on the merchant website and is presented with payment options 710. In the example of FIG. 7b, the user selects to pay through the mobile payment application 104, and subsequently selects to use a loyalty card associated with the merchant 712. As can be seen, in this arrangement the user authentication method associated with the merchant loyalty card selected is an eye scan. Following the processes previously described, the user is then informed whether or not the authentication was successful, as can be seen on the mobile device in FIG. 7a, 714.

Whilst various exemplary embodiments of the disclosed system and method have been described above it should be understood that they have been presented for purposes of example only, and should not be taken to be limitations. The above description is not exhaustive and does not limit the disclosure to the precise form disclosed. Modifications and variations are possible in light of the above teachings or may be acquired from practicing of the disclosure, without departing from the breadth or scope.

The invention claimed is:

1. A method for generating transaction credentials for a user in a transaction, comprising;
    storing, by a mobile device, an encrypted session key, and an encrypted user authentication credential;
    receiving, by the mobile device, an authorization request initiating a user authentication process at the mobile device;
    decrypting, by the mobile device, the encrypted session key and encrypted user authentication credential;
    obtaining, by the mobile device, based on the decrypting, a session key from the encrypted session key and a user authentication credential from the encrypted user authentication credential;
    determining, by the mobile device, a result of the user authentication process;
    selecting, by the mobile device, a null value for the user authentication credential based on the result of the user authentication process;
    generating, by the mobile device, a transaction cryptogram based on the selected value for the user authentication credential and the session key;
    transmitting, by the mobile device, the transaction cryptogram and a user authentication status to a transaction processing entity for use in a transaction;
    receiving, by a transaction management server, a transaction notification and the transaction cryptogram;
    identifying, by the transaction management server, a transaction account associated with a user based on the transaction notification;
    obtaining, by the transaction management server, account payment credentials based on the identified transaction account;
    selecting, by the transaction management server, the null value for the user authentication credential based on the result of the user authentication process and obtain the session key for the identified transaction account;
    generating, by the transaction management server, a validation cryptogram based on the account payment credentials, wherein the validation cryptogram is generated based on the null value for the user authentication credential and the obtained session key; and
    validating, by the transaction management server, the transaction cryptogram based on the validation cryptogram.

2. The method of claim 1, wherein the method further comprises:
    decrypting, by the mobile device, the encrypted session key;
    generating, by the mobile device, the transaction cryptogram based further on a null user identifier and the session key; and
    transmitting, by the mobile device, the transaction cryptogram and the user authentication status to the transaction processing entity for use in a transaction.

3. The method of claim 2, wherein the null user identifier comprises predetermined values, and is of the same length as a user identifier.

4. The method of claim 1, wherein the method comprises a user registration process, the user registration process comprising:
    providing, by the mobile device, user information to the transaction processing entity, registering, by the transaction processing entity, a transaction account associated with the user, at the transaction processing entity, and downloading, by the mobile device, an application associated with the transaction processing entity to the mobile device.

5. The method of claim 4, wherein the session key and the user authentication credential are associated with the transaction account associated with the user.

6. The method of claim 4, wherein the user registration process comprises registering, by the transaction processing entity, a plurality of transaction accounts associated with the user.

7. The method of claim 1, comprising transmitting, by the mobile device, the transaction cryptogram and the user authentication status from an application of the mobile device to a transaction management system (TMS).

8. The method of claim 1, wherein the user authentication credential is a consumer device cardholder verification method dynamic number (CDN).

9. The method of claim 1, wherein the user authentication process comprises any of the following: measurement of biometric information, personal identification number verification, personal information verification and signature verification.

10. A system for generating transaction credentials for a user in a transaction, comprising:
a mobile device comprising a processor programmed to:
store an encrypted session key, and an encrypted user authentication credential;
receive an authorization request and initiate a user authentication process;
decrypt the encrypted session key and encrypted user authentication credential;
obtain, based on the decrypt, a session key from the encrypted session key and a user authentication credential from the encrypted user authentication credential;
determine a result of the user authentication process;
select a null value for the user authentication credential based on the result of the user authentication process;
generate a transaction cryptogram based on the selected value for the user authentication credential and the session key;
transmit the transaction cryptogram and a user authentication status to a transaction processing entity for use in a transaction; and
a transaction management server programmed to:
receive a transaction notification and the transaction cryptogram;
identify a transaction account associated with a user based on the transaction notification;
obtain account payment credentials based on the identified transaction account;
select a null value for the user authentication credential based on a failure of the user authentication process and obtain the session key for the identified transaction account;
generate a validation cryptogram based on the account payment credentials, wherein the validation cryptogram is generated based on the null value for the user authentication credential and the obtained session key; and
validate the transaction cryptogram based on the validation cryptogram.

11. The method of claim 1, further comprising:
receiving, by the mobile device, a batch of encrypted session keys that are each derived from an account master key that is unique to a transaction account associated with the user, the batch of encrypted session keys including the encrypted session key; and
storing, by the mobile device, the batch of encrypted session keys in a mobile keystore of the mobile device, wherein storing the encrypted session key is part of storing the batch of encrypted session keys.

12. The method of claim 1, further comprising:
receiving, by the mobile device, a batch of encrypted session keys that are each derived from an account master key that is unique to a transaction account associated with the user, the batch of encrypted session keys including the encrypted session key;
decrypting, by the mobile device, the batch of encrypted session keys;
re-encrypting, by the mobile device, the decrypted batch of encrypted session keys; and
storing, by the mobile device, a result of the re-encrypting, wherein storing the encrypted session key is part of storing the result of the re-encrypting.

13. The method of claim 1, wherein selecting, by the mobile device, the value for the user authentication credential based on the result of the user authentication process comprises:
selecting, by the mobile device, a null value for the user authentication credential based on a failure of the user authentication process.

14. The method of claim 1, wherein selecting, by the mobile device, the value for the user authentication credential based on the result of the user authentication process comprises:
selecting, by the mobile device, a user identifier for the user authentication credential based on a success of the user authentication process.

15. The method of claim 1, wherein storing, by the mobile device, the encrypted session key comprises:
storing, by the mobile device, the encrypted session key in a mobile keystore, and wherein the method further comprises:
receiving, by the mobile keystore, a request for the session key from a mobile application executing at the mobile device;
determining, by the mobile keystore, that the result of the user authentication process was a successful authentication; and
releasing, by the mobile keystore to the mobile application, the session key that is used to generate the transaction cryptogram.

16. The system of claim 10, wherein the transaction notification comprises the result of the user authentication process, and wherein to obtain the account payment credentials, the transaction management server is further programmed to:
obtain the user authentication credential based on a success of the user authentication process and obtain the session key for the identified transaction account, wherein the validation cryptogram is generated based on the user authentication credential and the obtained session key.

* * * * *